United States Patent
Engelman et al.

(10) Patent No.: US 9,666,069 B2
(45) Date of Patent: May 30, 2017

(54) AUTONOMOUS VEHICLE HANDLING AND PERFORMANCE ADJUSTMENT

(71) Applicant: Ford Global Technologies, LLC, Dearborn, MI (US)

(72) Inventors: Gerald H. Engelman, Plymouth, MI (US); Alex Maurice Miller, Canton, MI (US); Richard Lee Stephenson, Ann Arbor, MI (US); Levasseur Tellis, Southfield, MI (US); Timothy D. Zwicky, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 333 days.

(21) Appl. No.: 14/180,680

(22) Filed: Feb. 14, 2014

(65) Prior Publication Data
US 2015/0235557 A1    Aug. 20, 2015

(51) Int. Cl.
G08G 1/09       (2006.01)
G08G 1/0967    (2006.01)

(52) U.S. Cl.
CPC ....... *G08G 1/096708* (2013.01); *G08G 1/091* (2013.01); *G08G 1/096725* (2013.01); *G08G 1/096741* (2013.01); *G08G 1/096791* (2013.01)

(58) Field of Classification Search
CPC .. G01C 21/3697; G01C 21/3453; G06K 9/00; G08G 1/09; G08G 1/096708; G08G 1/091; G06Q 30/0293
See application file for complete search history.

(56) References Cited

U.S. PATENT DOCUMENTS

| | | | |
|---|---|---|---|
| 7,979,172 B2 | 7/2011 | Breed | |
| 2003/0065432 A1* | 4/2003 | Shuman et al. | 701/48 |
| 2010/0104199 A1* | 4/2010 | Zhang et al. | 382/199 |
| 2010/0194593 A1* | 8/2010 | Mays | 340/905 |
| 2010/0246889 A1* | 9/2010 | Nara et al. | 382/104 |
| 2010/0308988 A1* | 12/2010 | Ieda et al. | 340/477 |
| 2013/0073122 A1 | 3/2013 | Hoshiya | |
| 2013/0179056 A1 | 7/2013 | Fukuyama | |
| 2014/0062725 A1* | 3/2014 | Maston | 340/905 |
| 2014/0279707 A1* | 9/2014 | Joshua et al. | 705/400 |

OTHER PUBLICATIONS

Akerblom et al., "Optimizing HEV Fuel Efficiency Using Cloud Stored Data", Master Thesis in Computer Science and Automotive Engineering, Chalmers University of Technology, Goteborg, Sweden 2013.

* cited by examiner

*Primary Examiner* — Yonel Beaulieu
*Assistant Examiner* — Martin Weeks
(74) *Attorney, Agent, or Firm* — Frank MacKenzie; Bejin Bieneman PLC

(57) ABSTRACT

A vehicle includes an autonomous driving sensor configured to detect a road condition and output at least one road condition signal representing the road condition, an autonomous mode controller configured to control the vehicle according to the at least one road condition signal, and a communication module configured to broadcast the road condition signal.

20 Claims, 3 Drawing Sheets

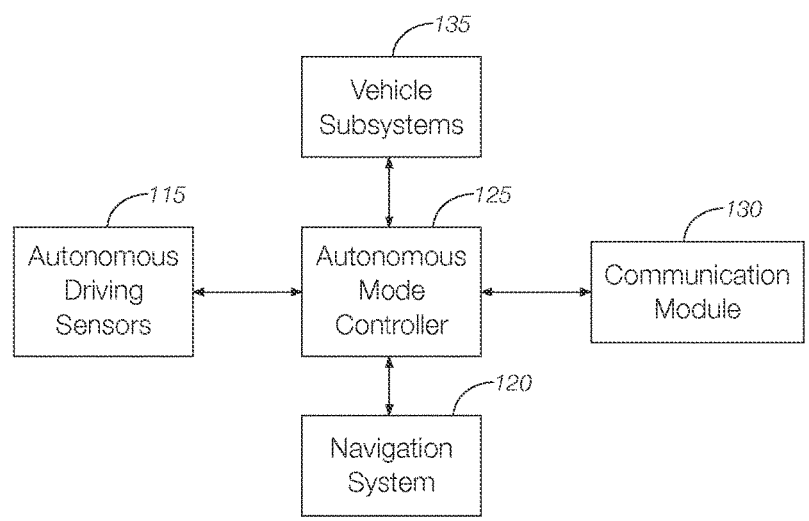
FIGURE 2
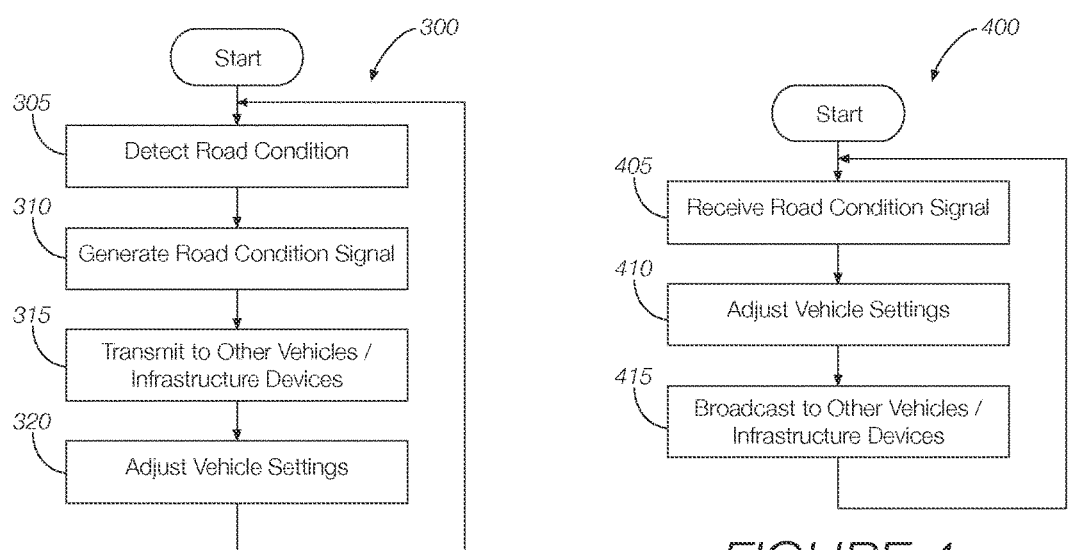
FIGURE 3
FIGURE 4

AUTONOMOUS VEHICLE HANDLING AND PERFORMANCE ADJUSTMENT

BACKGROUND

Autonomous vehicles relieve a driver of some driving-related tasks. Using sensors, the autonomous vehicle senses its surroundings and controls certain aspects of the vehicle accordingly. The autonomous vehicle is also prepared to compensate for changing road conditions.

BRIEF DESCRIPTION OF THE DRAWINGS

FIG. 2 is a schematic diagram of some exemplary components of the host vehicle.

FIG. 3 is a flowchart of an exemplary process that may be used by the host vehicle to adjust vehicle settings in accordance with changing road conditions and transmit the road condition to other vehicles and/or the infrastructure device.

FIG. 4 is a flowchart of an exemplary process that may be used by the host vehicle to adjust vehicle settings in accordance with changing road conditions received from the front vehicle and/or the infrastructure device.

DETAILED DESCRIPTION

An exemplary vehicle includes an autonomous driving sensor configured to detect a road condition and output at least one road condition signal representing the road condition, an autonomous mode controller configured to control the vehicle according to the at least one road condition signal, and a communication module configured to broadcast the road condition signal. This way, other vehicles within communication range may become aware of, and respond to, the road condition prior to independently detecting the road condition.

The elements shown in the FIGS. may take many different forms and include multiple and/or alternate components and facilities. The exemplary components illustrated are not intended to be limiting. Indeed, additional or alternative components and/or implementations may be used.

Figure 1:
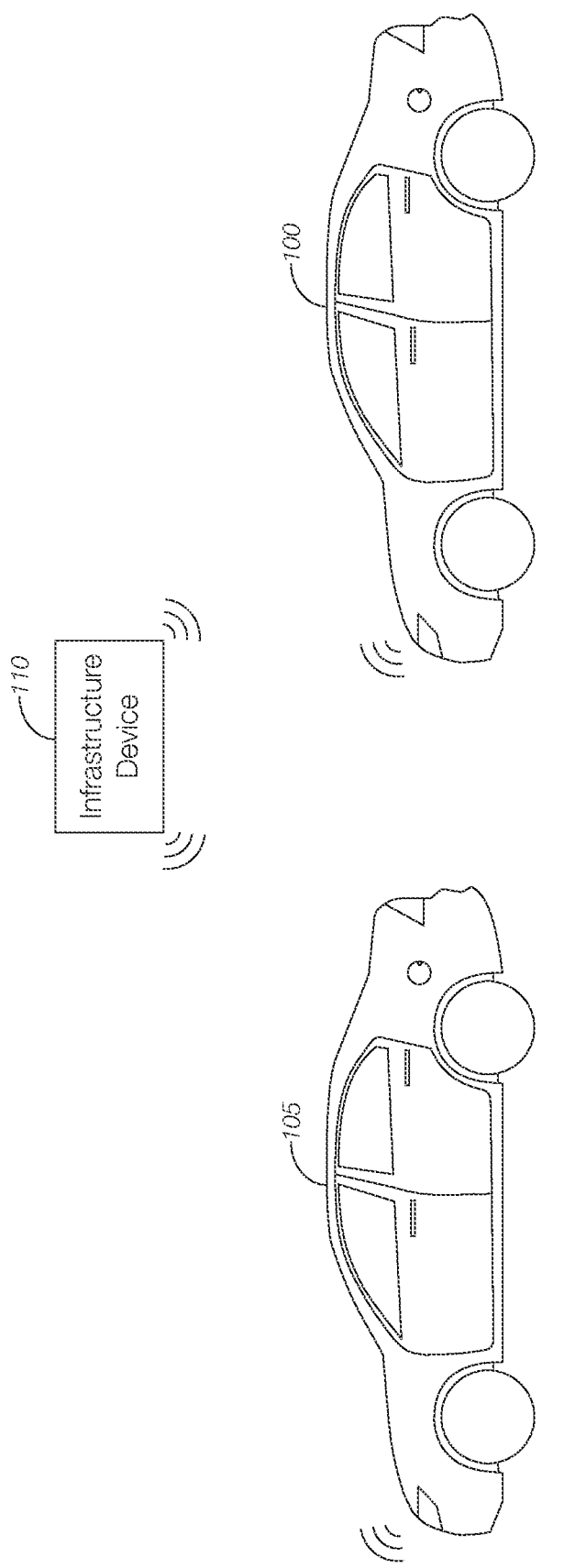
FIG. 1 illustrates a host vehicle that includes an exemplary system for adjusting to changing road conditions detected by a front vehicle and/or communicated from an infrastructure device.

As illustrated in FIG. 1, a host vehicle 100 and a front vehicle 105 are configured to detect a road condition and communicate the road condition to other vehicles and/or an infrastructure device 110. The host vehicle 100 and front vehicle 105 may each include any type of passenger or commercial vehicle. Examples of vehicles may include a car, truck, sport utility vehicle, crossover vehicle, bus, or the like. As discussed in greater detail below with regard to FIG. 2, the host vehicle 100 and the front vehicle 105 may detect various road conditions such as ice or snow on the road, an obstacle blocking one or more lanes, heavy traffic, a slippery road surface, flooding, a pothole, etc. When operating in an autonomous mode, the host vehicle 100 and/or the front vehicle 105 may adjust one or more vehicle settings, such as a driving speed, distance between other vehicles, driving lane, turning speed, or the like, in response to the detected road condition. Moreover, the host vehicle 100 and/or the front vehicle 105 may be configured to transmit a signal representing the road condition ("the road condition signal") to other vehicles in the area, as well as to any infrastructure devices 110 configured to receive such signals. The road condition signal may further indicate the time at which the road condition was detected as well as the location of the road condition.

The infrastructure device 110 may include any device configured to communicate with the host vehicle 100 and/or the front vehicle 105. The infrastructure device 110 may include any number of processing devices and communication devices that allow the infrastructure device 110 to receive the road condition signal, and in some circumstances, transmit the road condition signal to other vehicles in the vicinity of the infrastructure device 110. The infrastructure device 110 may be located near a roadway, such as on a bridge, overpass, sign, billboard, communication tower, building, traffic control device, or the like. In some implementations, the infrastructure device 110 may remain in a relatively fixed location.

Since road conditions may change, the host vehicle 100, the front vehicle 105, and/or the infrastructure device 110 may be configured to determine whether to communicate the road condition signal. For instance, a decay factor may be applied to the road condition signal so that the road condition detected expires after a predetermined amount of time since the passage of time may make the road condition obsolete. By way of example, a road condition indicating heavy traffic may begin to decay after rush hour is over or if other vehicles are beginning to report lighter traffic. Alternatively or in addition, the road condition may be rendered obsolete by changing circumstances, such as the occurrence of an event. For example, an icy road may be cured after the road is salted or after temperatures rise above freezing. Thus, the host vehicle 100, the front vehicle 105, and/or the infrastructure device 110 may be configured to consider such factors to determine whether the road condition detected by another vehicle or infrastructure device 110 is still relevant.

FIG. 2 is a schematic diagram of some exemplary components of the host vehicle 100. As shown, the host vehicle 100 may include at least one autonomous driving sensor 115, a navigation system 120, an autonomous mode controller 125, and a communication module 130.

The autonomous driving sensors 115 may include any number of devices configured to generate signals that help navigate the host vehicle 100 while the host vehicle 100 is operating in an autonomous (e.g., driverless) mode. Examples of autonomous driving sensors 115 may include a radar sensor, a lidar sensor, a camera, or the like. The autonomous driving sensors 115 help the host vehicle 100 "see" the roadway and/or negotiate various obstacles while the vehicle is operating in the autonomous mode. The autonomous driving sensors 115 may be configured to detect road conditions, discussed above, and generate the road condition signal representing the detected road condition.

The navigation system 120 may be configured to determine a location of the host vehicle 100. Using a positioning protocol, such as the Global Positioning System (GPS), the navigation system 120 may be configured to determine the location of the host vehicle 100 based on communications with one or more satellites. The navigation system 120 may be configured to output a signal representing a current location of the vehicle.

The autonomous mode controller 125 may be configured to control one or more subsystems 135 while the host vehicle 100 is operating in the autonomous mode. Examples of subsystems 135 that may be controlled by the autonomous mode controller 125 may include a brake subsystem, a suspension subsystem, a steering subsystem, and a powertrain subsystem. The autonomous mode controller 125 may control any one or more of these subsystems 135 by outputting signals to control units associated with these subsystems 135. The autonomous mode controller 125 may control the subsystems 135 based, at least in part, on signals generated by the autonomous driving sensors 115. For instance, the autonomous mode controller 125 may control the host vehicle 100 according to the road condition signals generated by the autonomous driving sensors 115. This may include adjusting a vehicle setting such as reducing a speed of the vehicle, changing the driving lane, selecting a new route, etc., depending on the type and location of the road condition detected. Moreover, as discussed in greater detail below, the autonomous driving sensor 115 may be configured to adjust one or more vehicle settings in accordance with road conditions detected by other vehicles, such as the front vehicle 105, and/or infrastructure devices 110 in the vicinity of the host vehicle 100. The road condition signals transmitted by other vehicles and/or infrastructure devices 110 may indicate the location of the road condition and the time the road condition was detected.

The communication module 130 may be configured to broadcast the detected road condition to other vehicles and/or infrastructure devices 110 within the vicinity of the host vehicle 100 according to one or more telecommunication protocols, such as the Dynamic Short Range Communication (DSRC) protocol. The communication module 130 may be further configured to broadcast the location of the road condition, as well as the time the road condition was detected. Moreover, the communication module 130 may be further configured to receive road condition signals transmitted by other nearby vehicles, such as the front vehicle 105, and/or the infrastructure device 110. The communication module 130 may be configured to rebroadcast such road condition signals if, e.g., the road condition still exists or is likely to still exist. For example, the communication module 130 may rebroadcast the road condition signal if the autonomous driving sensors 115 of the host vehicle 100 confirm the road condition in the same location, if the road condition was originally detected within a predetermined amount of time, and if no intervening events have occurred to remedy the road condition. Thus, even though the host vehicle 100 and front vehicle 105 may transmit road condition signals, the road condition may have been originally detected by yet another vehicle.

In general, computing systems and/or devices, such as the autonomous mode controller 125 and the navigation system 120, may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

FIG. 3 is a flowchart of an exemplary process 300 that may be used by the host vehicle 100 to adjust vehicle settings in accordance with changing road conditions and transmit the road condition to other vehicles and/or the infrastructure device 110.

At block 305, the host vehicle 100 may detect a road condition. The road condition may be detected by, e.g., one or more autonomous driving sensors 115 located on the host vehicle 100. Examples of conditions may include ice or snow on the road, an obstacle blocking one or more lanes, heavy traffic, a slippery road surface, flooding, a pothole, etc.

At block 310, the host vehicle 100 may generate the road condition signal representing the road condition detected at block 305. The road condition signal may be generated by, e.g., the autonomous mode controller 125 or another processing device in the host vehicle 100. Moreover, the road condition signal may be generated to identify, e.g., the location of the road condition, as determined by the navigation system 120, and/or the time the road condition was detected.

At block 315, the host vehicle 100 may transmit the road condition signal to one or more other vehicles and/or infrastructure devices 110 in the vicinity of the host vehicle 100. This way, other vehicles can become aware of, and respond to, the road condition prior to independently detecting the road condition. The communication module 130 of the host vehicle 100 may transmit the road condition signal according to one or more protocols such as the DSRC protocol.

At block 320, the host vehicle 100 may adjust one or more settings in response to the detected road condition. Examples of settings that may be adjusted in accordance with the detected road condition may include a driving speed, distance between other vehicles, driving lane, turning speed, or the like. Settings may be adjusted via, e.g., the autonomous mode controller 125.

After block 320, the process 300 may end or return to block 305.

FIG. 4 is a flowchart of an exemplary process 400 that may be used by the host vehicle 100 to adjust vehicle settings in accordance with changing road conditions received from the front vehicle 105 and/or the infrastructure device 110.

At block 405, the host vehicle 100 may receive the road condition signal from, e.g., the infrastructure device 110 and/or the front vehicle 105. The road condition signal may represent a road condition detected by the front vehicle 105 or another vehicle no longer in the vicinity (e.g., communication range) of the host vehicle 100, and the road condition signal may have been rebroadcast by a different vehicle (i.e., the front vehicle 105) and/or the infrastructure device 110. The road condition signal may identify the location of the road condition and the time at which the road condition was detected.

At block 410, the host vehicle 100 may adjust one or more settings in response to the detected road condition. Examples of settings that may be adjusted in accordance with the detected road condition may include a driving speed, distance between other vehicles, driving lane, turning speed, or the like. Settings may be adjusted via, e.g., the autonomous mode controller 125.

At block 415, the host vehicle 100 may broadcast the road condition signal to other vehicles and/or infrastructure devices 110 in the vicinity (e.g., communication range) of the host vehicle 100. This way, other vehicles can become aware of, and respond to, the road condition prior to independently detecting the road condition. As discussed above, the host vehicle 100 may broadcast the road condition signal using the communication module 130.

The process 400 may end after block 415, or alternatively, the process 400 may return to block 405 to wait for a subsequent road condition signal.

Figure 5:
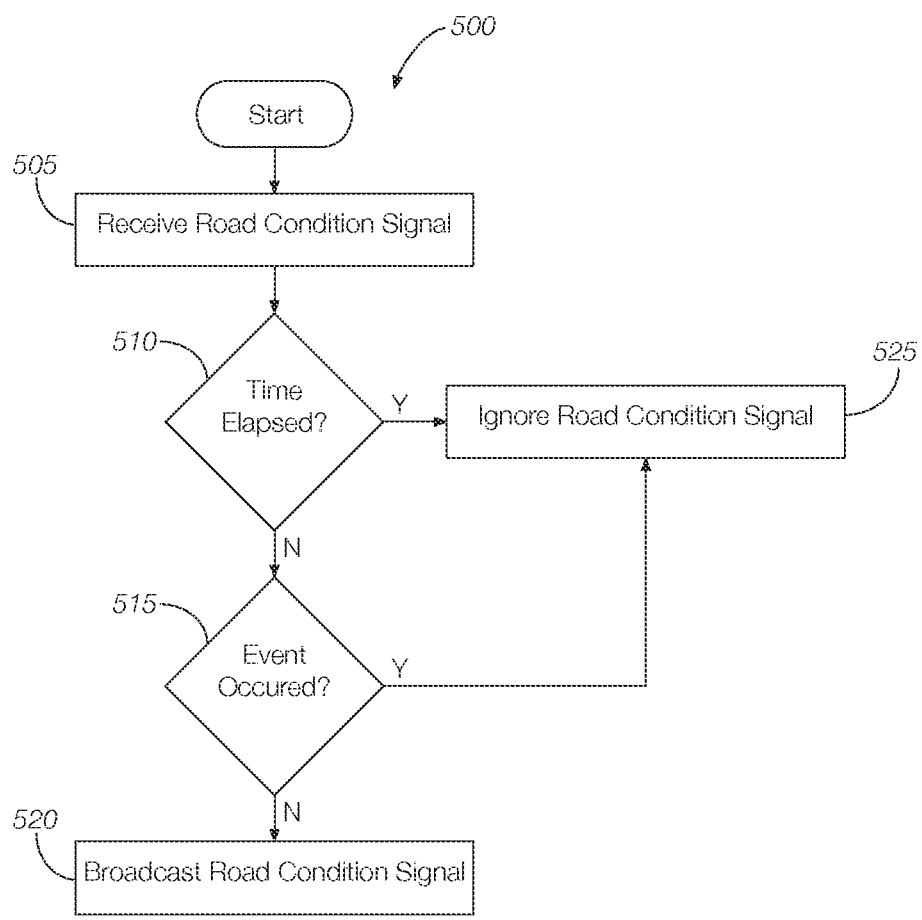
FIG. 5 is a flowchart of an exemplary process that may be implemented by the infrastructure device and/or the host vehicle to determine whether to forward a signal received by the front vehicle.

FIG. 5 is a flowchart of an exemplary process 500 that may be implemented by the infrastructure device 110 and/or the host vehicle 100 to determine whether to forward a signal received by the front vehicle 105. Forwarding the road condition signal may give other vehicles knowledge of the road condition, and time to respond to the road condition, without those other vehicles having to independently detect the road condition.

At block 505, the host vehicle 100 and/or the infrastructure device 110 may receive the road condition signal transmitted by, e.g., the front vehicle 105.

At decision block 510, the host vehicle 100 and/or the infrastructure device 110 may determine whether a predetermined amount of time has elapsed since the road condition was detected. To avoid broadcasting obsolete road condition signals, a decay factor may be applied to the road condition signal so that the road condition detected expires after a predetermined amount of time if the passage of time may make the road condition obsolete. By way of example, a road condition indicating heavy traffic may begin to decay after rush hour is over or if other vehicles are beginning to report lighter traffic, which could include failing to report heavy traffic. If the predetermined amount of time has not elapsed, the process 500 may continue at block 515. If the predetermined amount of time has elapsed, the process 500 may continue at block 525.

At decision block 515, the host vehicle 100 and/or the infrastructure device 110 may determine whether an event has occurred that would change the road condition, and in some cases, render the road condition obsolete. For example, an icy road may be cured after the road is salted or after temperatures rise above freezing. If no predetermined events that would render the road condition obsolete have occurred, the process 500 may continue at block 520. If a predetermined event that would render the road condition obsolete has occurred, the process 500 may continue at block 525.

At block 520, the host vehicle 100 and/or the infrastructure device 110 may broadcast the road condition signal to other vehicles and/or infrastructure devices 110 in the vicinity (e.g., communication range) of the host vehicle 100 and/or the infrastructure device 110. This way, other vehicles can become aware of, and respond to, the road condition prior to independently detecting the road condition. As discussed above, the host vehicle 100 and/or the infrastructure device 110 may broadcast the road condition signal using the communication module 130.

At block 525, the host vehicle 100 and/or the infrastructure device 110 may ignore the road condition signal. Ignoring the road condition signal may include purging the road condition signal from a memory device, ignoring subsequent road condition signals identifying the same location and time as the ignored road condition signal, or the like. This way, the host vehicle 100 and/or the infrastructure device 110 will refrain from broadcasting obsolete road condition signals, at least until there is evidence that the road condition exists again. Such evidence may include a subsequent road condition signal indicating that the road condition was detected after the occurrence of an event that may have remedied the road condition.

The process 500 may return to block 505 or end after executing blocks 525 or 520.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle comprising:
an autonomous driving sensor configured to detect a road condition and output at least one road condition signal representing the road condition;
an autonomous mode controller configured to control the vehicle according to the at least one road condition signal; and
a communication module configured to broadcast the road condition signal directly to nearby vehicles within a communication range of the communication module,
wherein the communication module is programmed to apply, to the road condition signal, a decay factor that defines a time at which the detected road condition expires and cease broadcasting the road condition signal in accordance with the decay factor.

2. The vehicle of claim 1, further comprising a navigation system configured to determine a location of the road condition.

3. The vehicle of claim 2, wherein the communication module is configured to transmit the location of the road condition.

4. The vehicle of claim 1, wherein the communication module is configured to receive at least one road condition signal transmitted by at least one other vehicle.

5. The vehicle of claim 4, wherein the road condition signal transmitted by the at least one other vehicle identifies a location of the road condition.

6. The vehicle of claim 4, wherein the autonomous mode controller is configured to control the vehicle according to the road condition signal transmitted by the at least one other vehicle.

7. The vehicle of claim 6, wherein the autonomous mode controller is configured to adjust at least one vehicle setting in accordance with the road condition represented by the road condition signal transmitted by the at least one other vehicle.

8. The vehicle of claim 1, wherein the communication module is configured to receive at least one road condition signal transmitted by an infrastructure device, and wherein the autonomous mode controller is configured to adjust at least one vehicle setting in accordance with the road condition represented by the road condition signal transmitted by the infrastructure device.

9. The vehicle of claim 1, wherein the road condition signal indicates a time at which the road condition was detected.

10. A vehicle system comprising:
an autonomous mode controller configured to control a host vehicle according to at least one road condition signal generated by an autonomous driving sensor, the road condition signal representing a detected road condition; and
a communication module configured to broadcast the road condition signal directly to nearby vehicles within a communication range of the communication module,
wherein the communication module is programmed to apply, to the road condition signal, a decay factor that defines a time at which the detected road condition expires and cease broadcasting the road condition signal in accordance with the decay factor.

11. The vehicle system of claim 10, wherein the communication module is configured to transmit a location of the road condition.

12. The vehicle system of claim 10, wherein the communication module is configured to transmit a time at which the road condition was detected.

13. The vehicle system of claim 10, wherein the communication module is configured to receive at least one road condition signal transmitted by a front vehicle.

14. The vehicle system of claim 13, wherein the road condition signal transmitted by the front vehicle identifies a location of the road condition and a time at which the road condition was detected.

15. The vehicle system of claim 13, wherein the autonomous mode controller is configured to control the host vehicle according to the road condition signal transmitted by the front vehicle.

16. The vehicle system of claim 15, wherein the autonomous mode controller is configured to adjust at least one setting of the host vehicle in accordance with the road condition represented by the road condition signal transmitted by the front vehicle.

17. The vehicle system of claim 14, wherein the road condition signal transmitted by the front vehicle represents a road condition that was not detected by the front vehicle.

18. The vehicle system of claim 10, wherein the communication module is configured to receive at least one road condition signal transmitted by an infrastructure device, and wherein the autonomous mode controller is configured to adjust at least one setting of the host vehicle in accordance with the road condition represented by the road condition signal transmitted by the infrastructure device.

19. A vehicle system comprising:
an autonomous mode controller configured to control a host vehicle when the host vehicle is operating in an autonomous mode; and
a communication module configured to receive at least one road condition signal transmitted by a front vehicle, wherein the road condition signal identifies a location of a road condition and a time at which the road condition was detected,
wherein the autonomous mode controller is configured to adjust at least one setting of the host vehicle in accordance with the road condition represented by the road condition signal transmitted by the front vehicle, and
wherein the communication module is configured to broadcast the at least one road condition signal directly to nearby vehicles within a communication range of the communication module, and wherein the communication module is programmed to apply, to the road condition signal, a decay factor that defines a time at which the detected road condition expires and cease broadcasting the road condition signal in accordance with the decay factor.

20. The vehicle system of claim 19, wherein the communication module is configured to receive at least one road condition signal transmitted by an infrastructure device, and wherein the autonomous mode controller is configure to adjust at least one setting of the host vehicle in accordance with the road condition represented by the road condition signal transmitted by the infrastructure device.

* * * * *